(12) United States Patent
Matsen et al.

(10) Patent No.: US 9,868,249 B2
(45) Date of Patent: Jan. 16, 2018

(54) INDUCTION WELDING SYSTEM

(71) Applicant: The Boeing Company, Chicago, IL (US)

(72) Inventors: Marc Rollo Matsen, Seattle, WA (US); Robert James Miller, Fall City, WA (US); William C. Dykstra, Rockford, MI (US)

(73) Assignee: THE BOEING COMPANY, Chicago, IL (US)

( * ) Notice: Subject to any disclaimer, the term of this patent is extended or adjusted under 35 U.S.C. 154(b) by 1220 days.

(21) Appl. No.: 13/942,055

(22) Filed: Jul. 15, 2013

(65) Prior Publication Data

US 2015/0014304 A1    Jan. 15, 2015

(51) Int. Cl.
*H05B 6/10* (2006.01)
*B29C 65/36* (2006.01)
(Continued)

(52) U.S. Cl.
CPC ........ *B29C 65/3668* (2013.01); *B29C 65/368* (2013.01); *B29C 65/3632* (2013.01); *B29C 65/4815* (2013.01); *B29C 65/5014* (2013.01); *B29C 65/5021* (2013.01); *B29C 65/5057* (2013.01); *B29C 66/003* (2013.01); *B29C 66/112* (2013.01); *B29C 66/131* (2013.01); *B29C 66/474* (2013.01); *B29C 66/49* (2013.01); *B29C 66/73921* (2013.01); *B29C 66/8432* (2013.01); *B29C 66/91411* (2013.01); *B29C 66/91651* (2013.01); *B64F 5/10* (2017.01); *B29C 66/712* (2013.01); *B29C 66/721* (2013.01); *B29C 66/7212* (2013.01); *B29C 66/8122* (2013.01); *B29C 66/959* (2013.01);

(Continued)

(58) Field of Classification Search
CPC ..... B64F 5/10; B29C 65/3632; B29C 65/368; B29C 65/4815; B29C 65/5014; B29C 65/5021; B29C 65/5057; B29C 66/003; B29C 66/112; B29C 66/131; B29C 66/474; B29C 66/49; B29C 66/73921; B29C 66/8432; B29C 66/91411; B29C 66/91651
USPC ........ 219/634, 607, 617, 611, 548, 527–529, 219/542–543, 482, 494, 647, 659, 672, 219/656, 674, 602, 633
See application file for complete search history.

(56) References Cited

U.S. PATENT DOCUMENTS 4,029,837 A * 6/1977 Leatherman .......... B29C 66/112
156/272.4
5,483,043 A * 1/1996 Sturman, Jr. ........... B29C 35/08
219/634

(Continued)

FOREIGN PATENT DOCUMENTS

WO    WO9640487 A1    12/1996

OTHER PUBLICATIONS

International Search Report and Written Opinion, dated Oct. 22, 2014, regarding Application No. PCT/US2014/041169, 12 pages.

*Primary Examiner* — Phuong Nguyen
(74) *Attorney, Agent, or Firm* — Yee & Associates, P.C.

(57) ABSTRACT

A method and apparatus for performing induction welding. A number of protective layers are positioned between a susceptor layer and at least one of a plurality of workpieces at a weld location. An undesired current path is prevented from forming at the weld location during induction heating of the plurality of workpieces by the number of protective layers.

20 Claims, 10 Drawing Sheets

(51) Int. Cl.

| | |
|---|---|
| *B29C 65/48* | (2006.01) |
| *B29C 65/50* | (2006.01) |
| *B29C 65/00* | (2006.01) |
| *B64F 5/10* | (2017.01) |
| *B29L 31/30* | (2006.01) |
| *B64C 1/12* | (2006.01) |
| *B64C 3/26* | (2006.01) |

(52) U.S. Cl.
CPC ......... *B29L 2031/3076* (2013.01); *B64C 1/12* (2013.01); *B64C 3/26* (2013.01)

(56) References Cited

U.S. PATENT DOCUMENTS

| | | | |
|---|---|---|---|
| 5,500,511 A * | 3/1996 | Hansen | B29C 65/3656 156/272.4 |
| 5,508,496 A | 4/1996 | Hansen et al. | |
| 5,935,475 A | 8/1999 | Scoles et al. | |
| 2002/0100547 A1* | 8/2002 | Takahashi | G06K 19/07722 156/289 |
| 2002/0113066 A1* | 8/2002 | Stark | B29C 35/0272 219/634 |
| 2012/0145703 A1 | 6/2012 | Matsen et al. | |
| 2013/0118574 A1* | 5/2013 | Usui | H01G 9/2068 136/256 |

* cited by examiner

INDUCTION WELDING SYSTEM

BACKGROUND INFORMATION

1. Field

The present disclosure relates generally to induction welding and, in particular, to using induction welding to attach a skin to a number of stiffeners. Still more particularly, the present disclosure relates to a method and apparatus for attaching a skin to a number of stiffeners using at least one stack-up comprised of a susceptor layer and one or more protective layers.

2. Background

Induction welding is a type of welding that uses electromagnetic radiation to heat a workpiece. Typically, an induction welding system includes one or more induction coils that are energized with a radio frequency electric current, which in turn, generates a high-frequency electromagnetic field. This electromagnetic field may heat the workpiece.

When the workpiece is electrically conductive, the heating may take the form of resistive heating that occurs due to induced currents, referred to as eddy currents. When the workpiece is a ferromagnetic workpiece, the heating may be caused by hysteresis. In particular, the electromagnetic field may cause repeated distortions of the magnetic domains of the ferromagnetic workpiece. Typically, a combination of these two effects is involved in the heating of a workpiece.

In some cases, susceptors may be used to inductively weld materials together. As used herein, a "susceptor" is an object comprised of a compound that is capable of absorbing the electromagnetic energy generated by an induction coil. In response to absorbing this electromagnetic energy, the compound is heated and then loses this heat to materials surrounding the compound through thermal conduction. A susceptor may take the form of, for example, without limitation, a susceptor wire.

Susceptors may be used to inductively weld materials such as, for example, without limitation, nonmagnetic materials, electrically insulated materials, magnetic materials, electrically conductive materials, composite materials, metallic materials, nonmetallic materials, other types of materials, or some combination thereof. Susceptors may be used to inductively weld materials together without requiring that a current path travel through the materials being welded together.

However, in some situations, when using susceptor wires and large induction coils in the form of solenoids to perform induction welding, undesirable current paths may be formed. These current paths may cause portions of a workpiece that were not intended to be heated to become hot. In some cases, these current paths may cause portions of a workpiece to become overheated. This overheating may cause undesired inconsistencies to develop in and/or on the workpiece. For example, a portion of a workpiece that is overheated may burn. Therefore, it would be desirable to have a method and apparatus that take into account at least some of the issues discussed above, as well as other possible issues.

SUMMARY

In one illustrative embodiment, an apparatus comprises a susceptor layer comprised of a number of susceptors and a number of protective layers. The number of protective layers is positioned between the susceptor layer and at least one of a plurality of workpieces at a weld location. The number of protective layers is configured to prevent an undesired current path from forming at the weld location during induction heating of the plurality of workpieces using the number of susceptors.

In another illustrative embodiment, an induction welding system comprises an induction heating system, a retaining structure, and a number of weld stack-ups. The retaining structure is configured to retain a first workpiece and a second workpiece configured to be induction-welded to the first workpiece at a number of weld locations. Each weld stack-up in the number of weld stack-up is configured to be positioned at a corresponding weld location in the number of weld locations to prevent an undesired current path from forming at the corresponding weld location during induction heating of the first workpiece and the second workpiece by the induction heating system.

In yet another illustrative embodiment, a method for performing induction welding is provided. A number of protective layers are positioned between a susceptor layer and at least one of a plurality of workpieces at a weld location. An undesired current path is prevented from forming at the weld location during induction heating of the plurality of workpieces by the number of protective layers.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account different considerations. For example, the illustrative embodiments recognize and take into account that it may be desirable to have a method and apparatus for interrupting undesired current paths that may form during induction welding and/or preventing the formation of these undesired current paths. The illustrative embodiments recognize and take into account that one or more fiberglass layers may be capable of interrupting these types of current paths. Thus, the illustrative embodiments provide a method and apparatus for performing induction welding.

Figure 1:
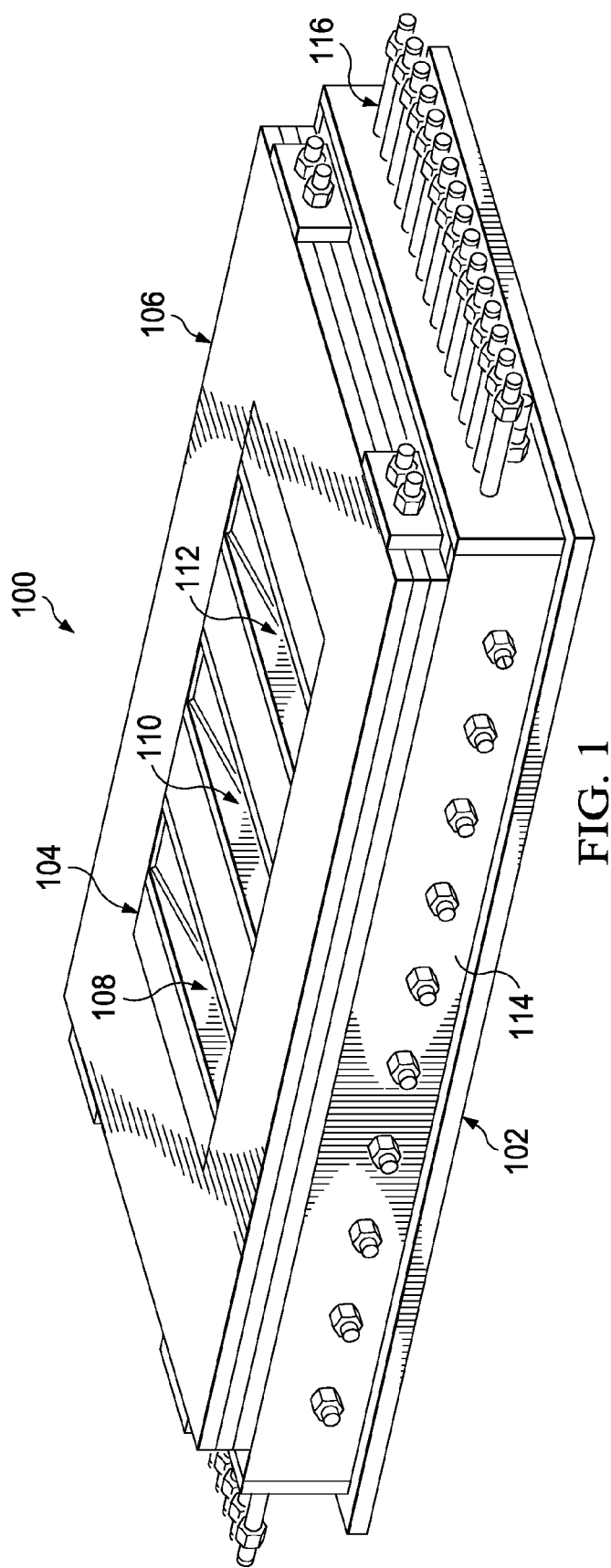
FIG. 1 is an illustration of a partially assembled induction welding system in accordance with an illustrative embodiment.

Referring now to the figures and, in particular, with reference to FIG. 1, an illustration of a partially assembled induction welding system is depicted in accordance with an illustrative embodiment. In this illustrative example, induction welding system 100 may include first base 102 and retaining structure 104.

As depicted, retaining structure 104 may hold object 106. Object 106 may be configured for use in forming stiffeners. For example, object 106 may have hollow portions 108, 110, and 112. Each of these hollow portions may be configured to receive a stiffener. In particular, each of these hollow portions may have a shape configured to substantially conform to the outer shape of the stiffener to be placed within the hollow portion. In some cases, object 106 may be referred to as a caul.

In this illustrative example, first base 102 may include ceramic tool 114 and induction coils 116. Ceramic tool 114 and induction coils 116 may be used to perform the induction welding. Induction coils 116 may take the form of solenoidal coils, also referred to as solenoids, in this illustrative example.

Figure 2:
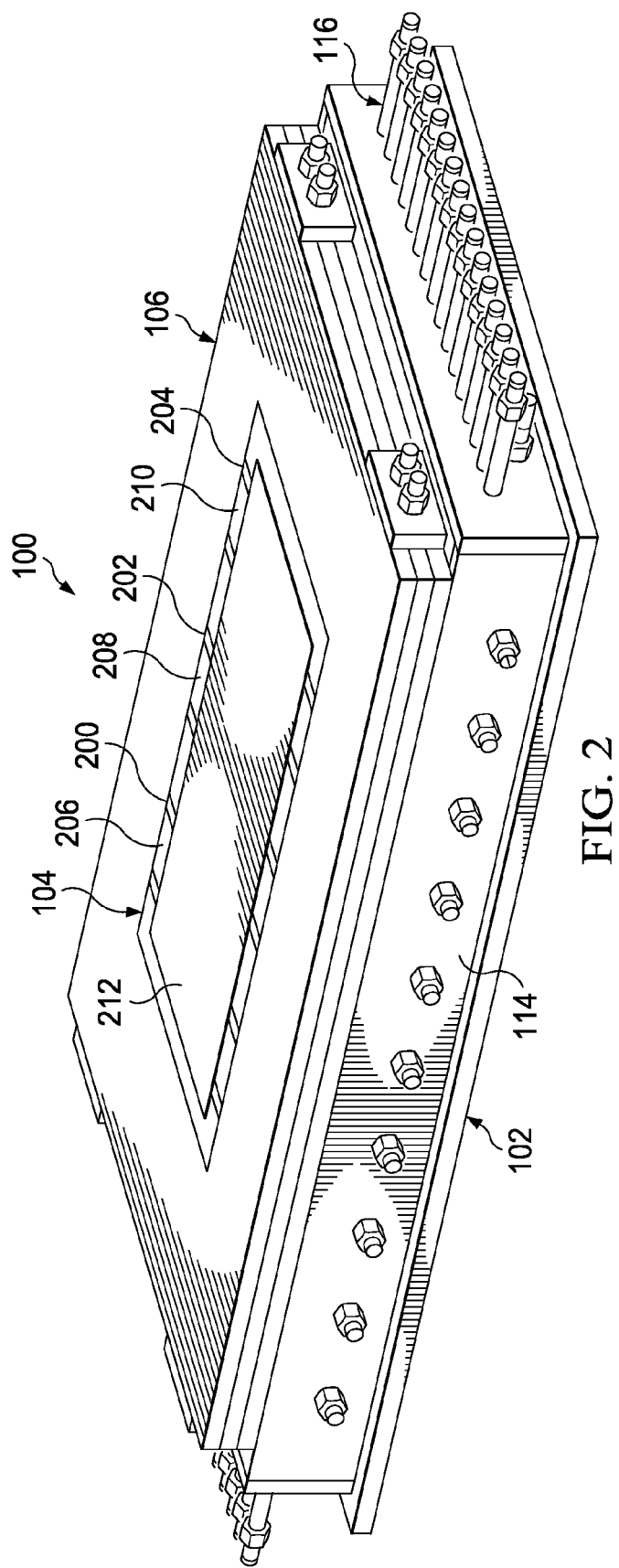
FIG. 2 is an illustration of a retaining structure of an induction welding system retaining a number of stiffeners and a skin that are to be induction-welded in accordance with an illustrative embodiment.

With reference now to FIG. 2, an illustration of retaining structure 104 of induction welding system 100 from FIG. 1 retaining a number of stiffeners and a skin that are to be induction-welded is depicted in accordance with an illustrative embodiment. In this illustrative example, stiffeners 200, 202, and 204 have been placed within hollow portions 108, 110, and 112, from FIG. 1, respectively, of object 106.

Stiffeners 200, 202, and 204 may be hat stiffeners in this illustrative example. In this manner, each of stiffeners 200, 202, and 204 may be shaped like a hat.

Further, tools 206, 208, and 210 may be placed within stiffeners 200, 202, and 204, respectively, to help these stiffeners retain their shape during the induction welding processing. In some illustrative examples, tools 206, 208, and 210 may be referred to as dies.

As depicted, skin 212 has been placed over stiffeners 200, 202, and 204 and tools, 206, 208, and 210. Induction welding system 100 may be used to weld skin 212 to stiffeners 200, 202, and 204.

In this illustrative example, skin 212 and stiffeners 200, 202, and 204 may be comprised of one or more thermoplastic materials. For example, without limitation, skin 212 and stiffeners 200, 202, and 204 may be comprised of a fiber-reinforced composite material.

A plurality of weld stack-ups (not shown) may be placed on stiffeners 200, 202, and 204 prior to skin 212 being placed over the stiffeners. These weld stack-ups may be placed at locations on the stiffeners that are to be induction-welded to skin 212. An illustration of one of these weld stack-ups may be depicted in FIGS. 5-6.

Figure 3:
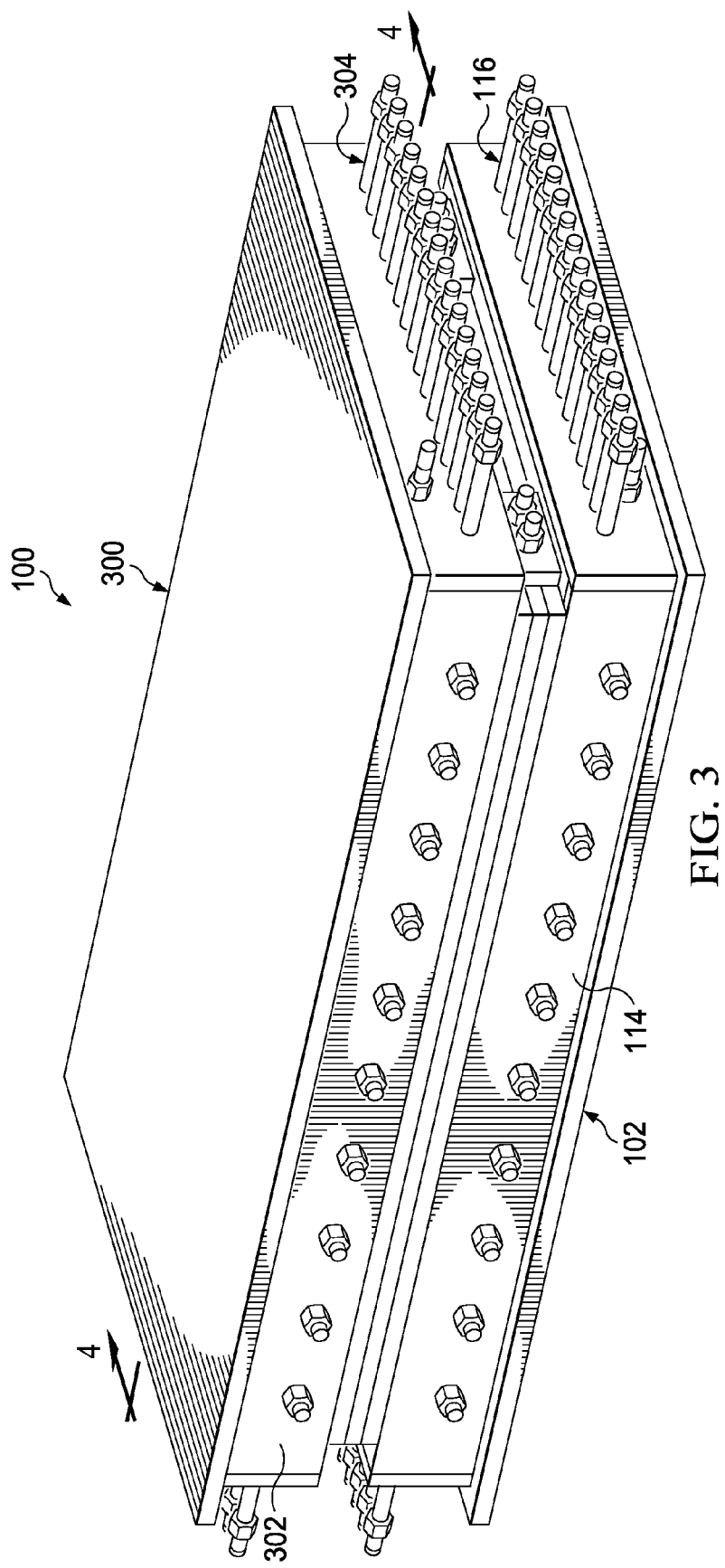
FIG. 3 is an illustration of a fully assembled induction welding system in accordance with an illustrative embodiment.

With reference now to FIG. 3, an illustration of a fully assembled induction welding system 100 is depicted in accordance with an illustrative embodiment. In this illustrative example, second base 300 has been positioned over retaining structure 104 from FIG. 1 such that induction welding system 100 may be fully assembled. Second base 300 may include ceramic tool 302 and induction coils 304, similar to ceramic tool 114 and induction coils 116 of first base 102.

Induction coils 116 and induction coils 304 may be energized with a radio frequency electric current. The frequency of this radio frequency electric current may be greater than about 30 kilohertz (kHz). Energizing these induction coils with this type of current may generate an electromagnetic field of electromagnetic energy that allows stiffeners 200, 202, and 204 to be induction-welded to skin 212.

Figure 4:
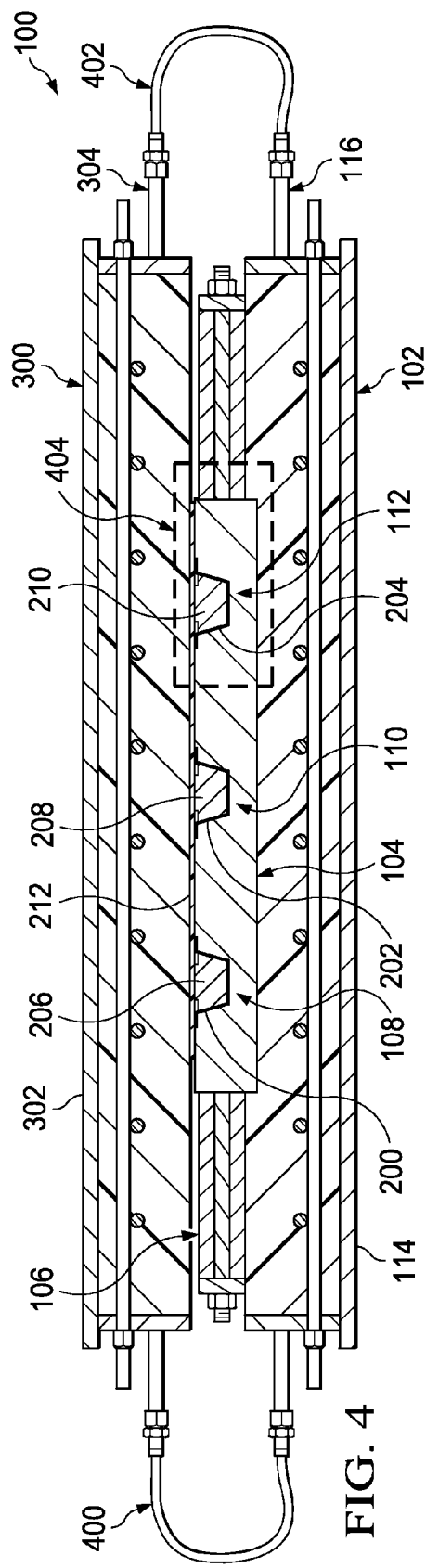
FIG. 4 is an illustration of a cross-sectional view of the fully assembled induction welding system in accordance with an illustrative embodiment.

With reference now to FIG. 4, an illustration of a cross-sectional view of the fully assembled induction welding system 100 is depicted in accordance with an illustrative embodiment. In this illustrative example, a cross-sectional view of induction welding system 100 from FIG. 3 is depicted with respect to lines 4-4.

In this illustrative example, wires 400 and wires 402 may be seen connecting induction coils 116 to induction coils 304. In this manner, a radio frequency electric current may be used to energize induction coils 116 and induction coils 304.

A weld stack-up may be positioned between stiffener 204 and skin 212 in section 404. An enlarged view of section 404 may be seen in FIG. 5 below.

Figure 5:
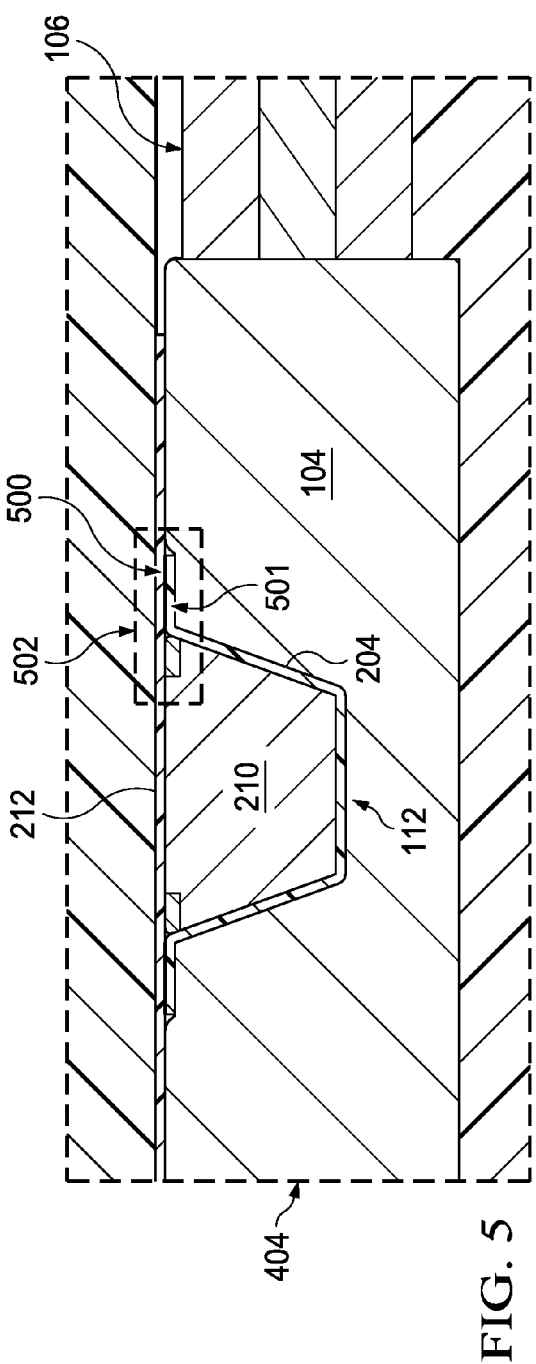
FIG. 5 is an enlarged view of a weld location between a stiffener and a skin in accordance with an illustrative embodiment.

With reference now to FIG. 5, an illustration of an enlarged view of a weld location between stiffener 204 and skin 212 is depicted in accordance with an illustrative embodiment. As depicted, weld stack-up 500 may be positioned between stiffener 204 and skin 212 at weld location 501. Weld location 501 may be one of the locations at which stiffener 204 is designated to be induction-welded to skin 212. Weld location 501 may be within section 502. An enlarged view of section 502 may be depicted in FIG. 6 below.

Figure 6:
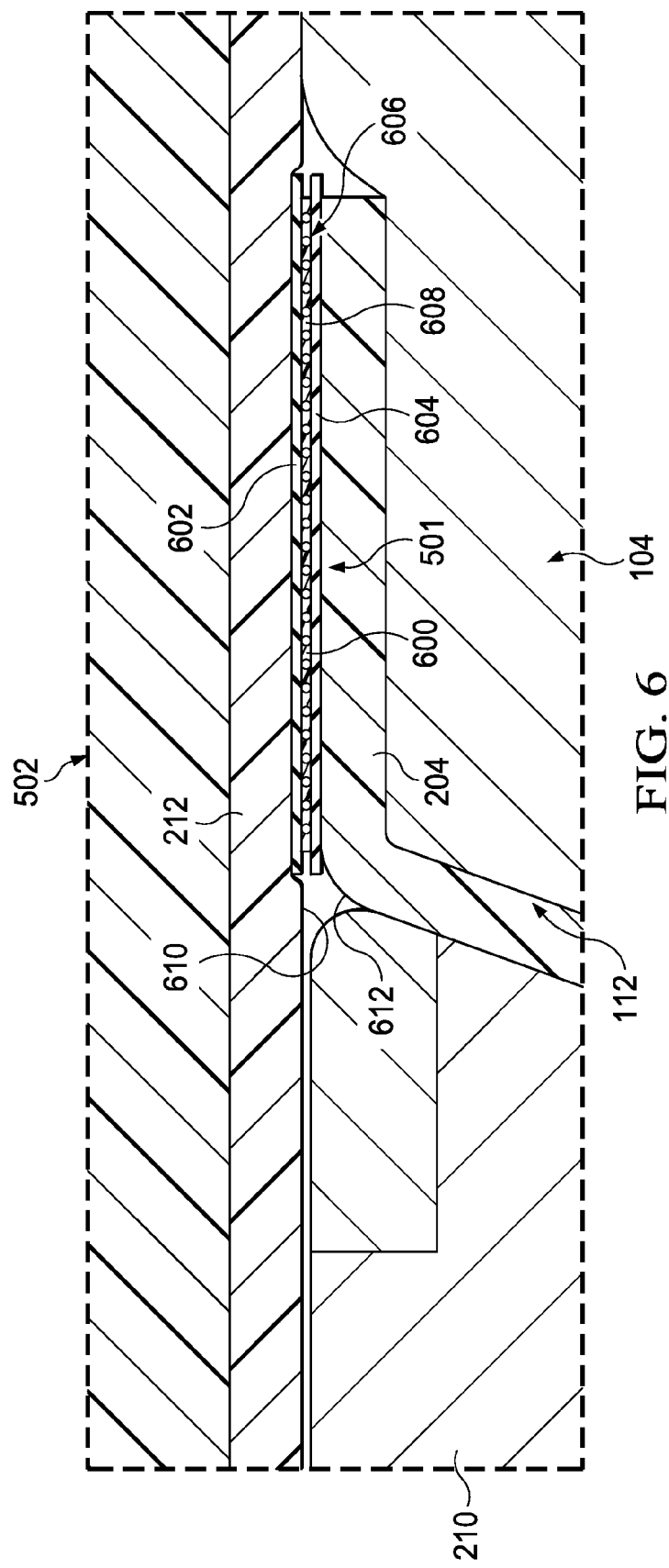
FIG. 6 is an enlarged view of a weld stack-up in accordance with an illustrative embodiment.

With reference now to FIG. 6, an illustration of an enlarged view of weld stack-up 500 from FIG. 5 is depicted in accordance with an illustrative embodiment. As depicted, weld stack-up 500 may include susceptor layer 600, first protective layer 602, and second protective layer 604.

Susceptor layer 600 may be comprised of plurality of susceptor wires 606 embedded within weld layer 608. Weld layer 608 may be comprised of a material configured to allow skin 212 to be induction-welded to stiffener 204. In this illustrative example, weld layer 608 may take the form of a resin layer. For example, weld layer 608 may be comprised of the same resin material present in stiffener 204 and skin 212.

First protective layer 602 may be positioned between susceptor layer 600 and skin 212. In this manner, first protective layer 602 may contact surface 610 of skin 212. Second protective layer 604 may be positioned between susceptor layer 600 and stiffener 204. In this manner, second protective layer 604 may contact surface 612 of stiffener 204.

First protective layer 602 and second protective layer 604 may be comprised of materials configured to prevent electric current from flowing between skin 212 and stiffener 204. In particular, first protective layer 602 and second protective layer 604 may be comprised of materials configured to prevent current from being transmitted from plurality of susceptor wires 606 to the fibers in skin 212 and/or the fibers in stiffener 204 and from being transmitted between skin 212 and stiffener 204.

Further, first protective layer 602 and second protective layer 604 may be comprised of materials configured to allow first protective layer 602 to be welded to skin 212 and weld layer 608 and second protective layer 604 to be welded to stiffener 204 and weld layer 608. In this manner, skin 212 may be welded to stiffener 204 at weld location 501 without any undesired current paths between susceptor layer 600 and skin 212, between susceptor layer 600 and stiffener 204, or between skin 212 and stiffener 204 forming.

Figure 7:
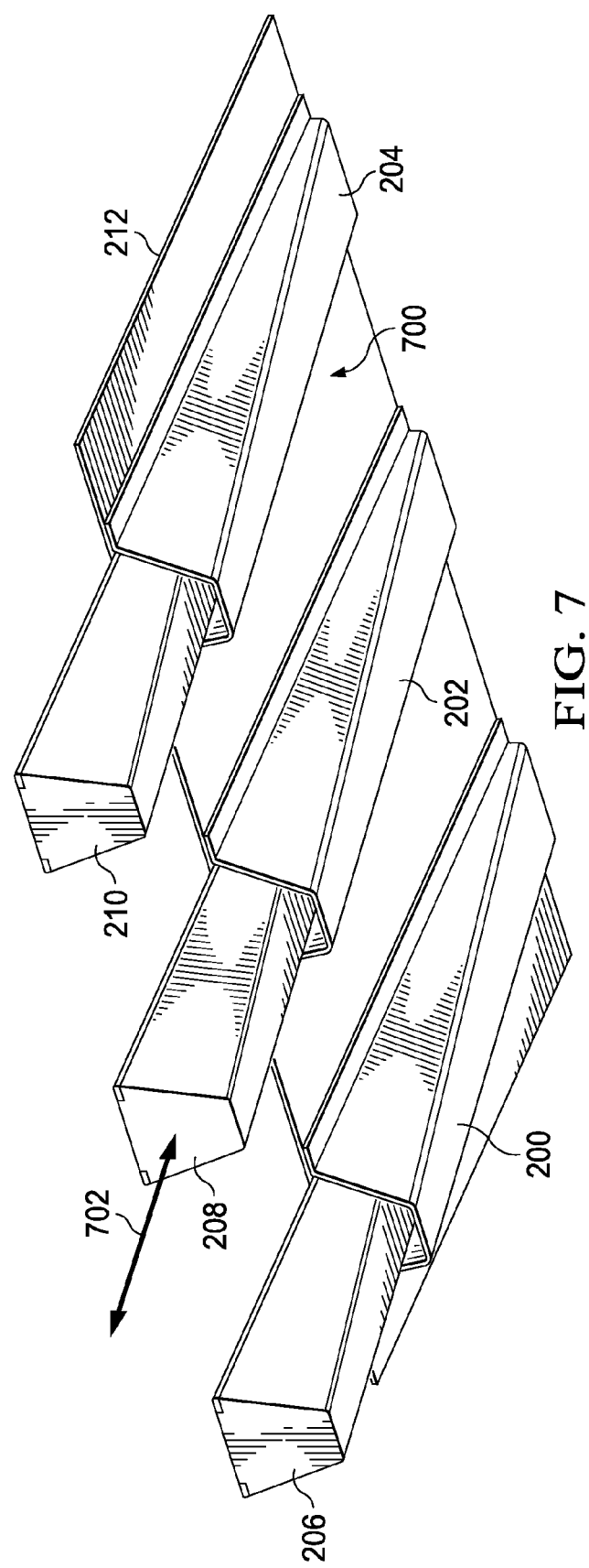
FIG. 7 is an illustration of a final welded stiffener-skin assembly in accordance with an illustrative embodiment.

With reference now to FIG. 7, an illustration of a final welded stiffener-skin assembly is depicted in accordance with an illustrative embodiment. In this illustrative example, stiffeners 200, 202, and 204 have been induction-welded to skin 212 to form welded stiffener-skin assembly 700. Once welded stiffener-skin assembly 700 has been formed, tools 206, 208, and 210 may be removed by sliding the tools out of welded stiffener-skin assembly 700 in the direction of arrow 702.

The illustrations of induction welding system 100 in FIGS. 1-4, weld location 501 and weld stack-up 500 in FIGS. 5-6, and welded stiffener-skin assembly 700 in FIG. 7 are not meant to imply physical or architectural limitations to the manner in which an illustrative embodiment may be implemented. Other components in addition to or in place of the ones illustrated may be used. Some components may be optional.

The different components shown in FIGS. 1-7 may be illustrative examples of how components shown in block form in FIG. 8 below can be implemented as physical structures. Additionally, some of the components in FIGS. 1-7 may be combined with components in FIG. 8, used with components in FIG. 8, or a combination of the two.

Figure 8:
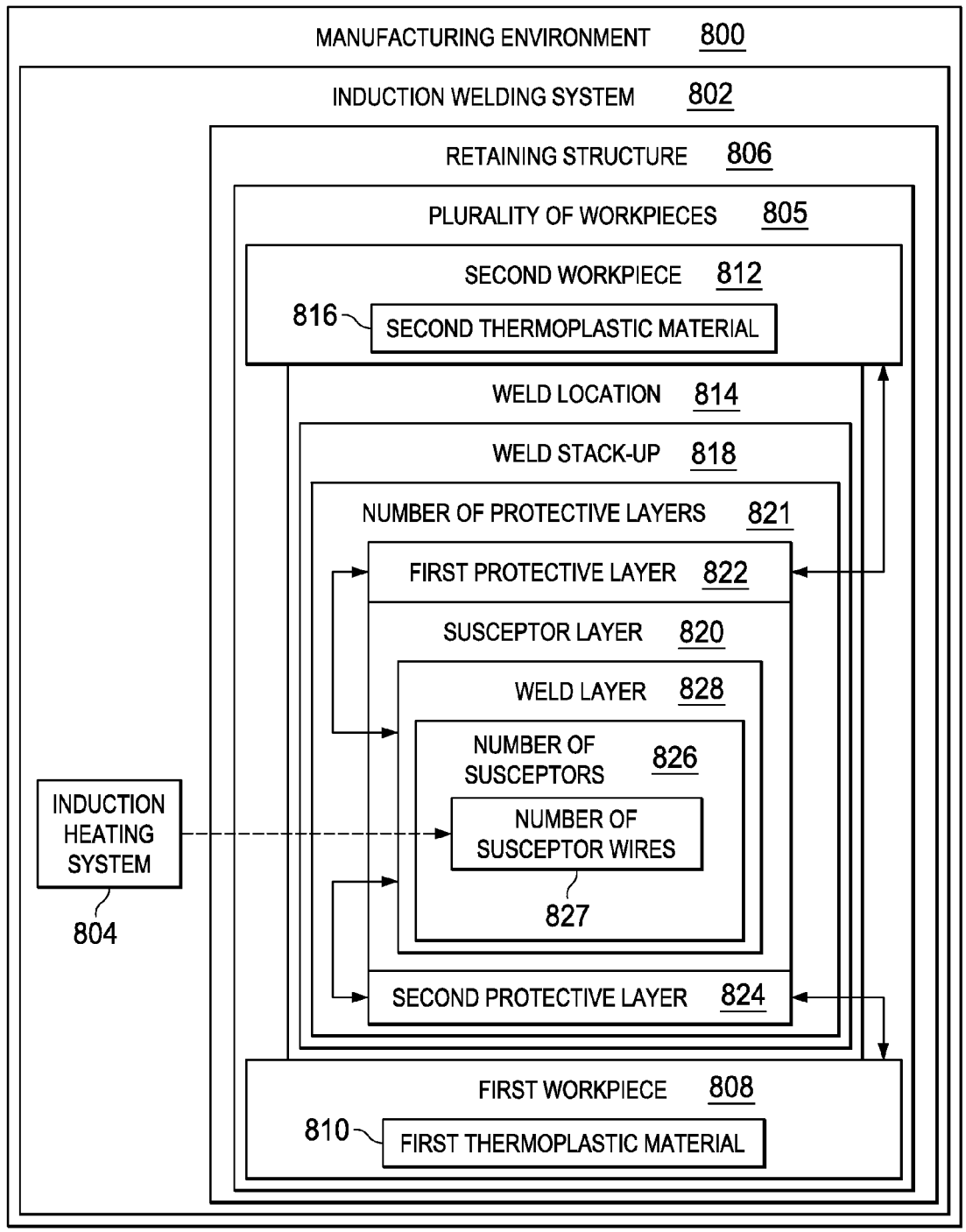
FIG. 8 is an illustration of a manufacturing environment in the form of a block diagram in accordance with an illustrative embodiment.

With reference now to FIG. 8, an illustration of a manufacturing environment in the form of a block diagram is depicted in accordance with an illustrative embodiment. In this illustrative example, manufacturing environment 800 may be an example of an environment in which induction welding system 802 may be used. Induction welding system 100 in FIGS. 1-4 may be an example of one manner in which induction welding system 802 may be implemented.

As depicted, induction welding system 802 may include induction heating system 804 and retaining structure 806. Induction heating system 804 may be configured to heat plurality of workpieces 805 that are to be induction-welded. Induction heating system 804 may be comprised of any number of components configured to provide induction-based heating of plurality of workpieces 805. First base 102 comprising ceramic tool 114 and induction coils 116 in FIGS. 1-4 and second base 300 comprising ceramic tool 302 and induction coils 304 in FIGS. 3-4, as well as wires 400 and wires 402 in FIG. 4 may be an example of one implementation for induction heating system 804.

Further, retaining structure 104 in FIG. 1 may be an example of one manner in which retaining structure 806 may be implemented. Retaining structure 806 may be configured to hold plurality of workpieces 805 that are to be induction-welded. In one illustrative example, plurality of workpieces 805 may include first workpiece 808 and second workpiece 812.

Retaining structure 806 may be configured to retain first workpiece 808 that is to be induction-welded to second workpiece 812. Skin 212 and stiffener 204 from FIGS. 2-7 may be examples of implementations for first workpiece 808 and second workpiece 812, respectively.

First workpiece 808 may be comprised of first thermoplastic material 810. Second workpiece 812 may be configured to be induction-welded to first workpiece 808 at a number of weld locations. For example, second workpiece 812 may be configured to be induction-welded to first workpiece 808 at weld location 814. Second workpiece 812 may be comprised of second thermoplastic material 816.

Depending on the implementation, first thermoplastic material 810 may be a same material as or a different material from second thermoplastic material 816. Each of these thermoplastic materials may be comprised of one or more materials configured to become soft, pliable, or moldable in response to heat. For example, first thermoplastic material 810 and second thermoplastic material 816 may be comprised of at least one of a composite material, a fiber-reinforced composite material, an elastomeric material, or some other type of material.

As used herein, the phrase "at least one of," when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required.

For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

A number of weld stack-ups may be used for induction-welding of first workpiece 808 to second workpiece 812 at a number of weld locations. For example, each weld stack-up in the number of weld stack-ups may be configured to be positioned at a corresponding weld location in the number of weld locations to prevent an undesired current path from forming at the corresponding weld location during induction heating of first workpiece 808 and second workpiece 812.

In one illustrative example, weld stack-up 818 may be positioned at weld location 814 between first workpiece 808 and second workpiece 812. Weld stack-up 818 may be comprised of susceptor layer 820 and number of protective layers 821. Number of protective layers 821 may be configured to be positioned between susceptor layer 820 and at least one of plurality of workpieces 805.

In one illustrative example, number of protective layers 821 may include first protective layer 822 and second protective layer 824. Susceptor layer 600, first protective layer 602, and second protective layer 604 in FIG. 6 may be examples of implementations for susceptor layer 820, first protective layer 822, and second protective layer 824, respectively.

Susceptor layer 820 may be configured to absorb the electromagnetic energy produced by the electromagnetic field generated using induction heating system 804. In some cases, susceptor layer 820 may be considered part of induction heating system 804.

As depicted, susceptor layer 820 may be comprised of number of susceptors 826. As used herein, a "number of" items may include one or more items. In this manner, number of susceptors 826 may include one or more susceptors. A "susceptor," as used herein, may be any object configured to absorb electromagnetic energy and convert electromagnetic energy into thermal energy, or heat. A susceptor may take a number of different forms. For example, without limitation, a susceptor in number of susceptors 826 may be implemented in the form of a wire, a rod, a filament, a plate, a strip, a sheet, or some other object having some other type of shape. Further, a susceptor may be comprised of any number of materials.

In this illustrative example, a susceptor in number of susceptors 826 may be comprised of at least one of a magnetically permeable material, a ceramic material, a metal material, or some other type of material. A magnetically permeable material may be comprised of any number of materials configured to generate heat in response to interacting with an electromagnetic flux field. The magnetically permeable material may be comprised of at least one of an alloy, a cobalt, an iron alloy, a nickel and iron alloy, an iron and silicon alloy, an amorphous magnetic alloy, a crystalline magnetic alloy, or some other type of material.

Number of susceptors 826 may be embedded within, placed on top of, weaved in and out of, and/or associated with weld layer 828 in some other manner. In one illustrative example, number of susceptors 826 may take the form of number of susceptor wires 827. Plurality of susceptor wires 606 and weld layer 608 in FIG. 6 may be examples of implementations for number of susceptor wires 827 and weld layer 828.

Each of number of susceptors 826 may be configured to absorb electromagnetic energy, become hot, and then dissipate heat to materials surrounding the susceptor wire. In particular, number of susceptors 826 may dissipate heat into at least one of weld layer 828, first protective layer 822, second protective layer 824, first workpiece 808, and second workpiece 812 in response to absorption of the electromagnetic energy by number of susceptors 826. In this illustrative example, number of susceptors 826 may be a number of smart susceptors, which may be implemented in the form of a number of smart susceptor wires. In other words, each susceptor in number of susceptors 826 may be configured to intrinsically level off at a selected temperature.

In particular, smart susceptors may be configured to generate heat up to at least a selected weld temperature. This selected weld temperature may be the temperature needed for welding to occur between first workpiece 808 and second workpiece 812. A smart susceptor may be formed such that the magnetic properties of the smart susceptor change at a particular temperature, which may be referred to as the Curie temperature or the Curie point. The smart susceptor may be unable to increase in temperature much beyond the Curie temperature. In this illustrative example, each smart susceptor may be formed such that the Curie temperature for the smart susceptor is at least the selected weld temperature. Further, each smart susceptor may be formed such that the smart susceptor heats up to the Curie temperature at a desired rate.

In this manner, smart susceptor wires may be substantially self-controlling. In other words, the temperature to which a smart susceptor is heated may be self-limiting based on the selection of the Curie temperature for that smart susceptor.

Weld layer 828 may be configured for use in welding first protective layer 822 to second protective layer 824. Weld layer 828 may be comprised of a thermoplastic material.

First protective layer 822 may be positioned between susceptor layer 820 and first workpiece 808. Second protective layer 824 may be positioned between susceptor layer 820 and second workpiece 812. First protective layer 822 may be configured for use in welding weld layer 828 to first workpiece 808. Second protective layer 824 may be configured for use in welding weld layer 828 to second workpiece 812. In this manner, first workpiece 808 may be welded to second workpiece 812.

First protective layer 822 and second protective layer 824 may be comprised of one or more materials configured to prevent electric current from flowing between first workpiece 808 and second workpiece 812. At least one of first protective layer 822 and second protective layer 824 may be used to prevent an undesired current path from forming at weld location 814 during induction heating of first workpiece 808 and second workpiece 812.

In particular, at least one of first protective layer 822 and second protective layer 824 may be used to prevent number of susceptors 826 in susceptor layer 820 from transmitting electric current to any conductive material that may be present within first workpiece 808 and/or within second workpiece 812, thereby forming a current path between first workpiece 808 and within second workpiece 812. Further, at least one of first protective layer 822 and second protective layer 824 may be configured to prevent electric current from being directly transmitted between first workpiece 808 and second workpiece 812.

For example, without limitation, first protective layer 822 and second protective layer 824 may be comprised of at least one of a fiberglass material, a resin material, or some other type of material. First protective layer 822 and second protective layer 824 may be comprised of a thermoplastic material such that these layers may be welded to weld layer 828, and first workpiece 808 and second workpiece 812, respectively, but may not be comprised of any material configured to conduct electric current.

In this manner, the undesired effects that may be caused by overheating of first workpiece 808 and/or second workpiece 812 at weld location 814 due to undesired current paths may be prevented. Weld stack-up 818 may allow induction welding at weld location 814 but may protect first workpiece 808 and second workpiece 812.

The illustration of manufacturing environment 800 and induction welding system 802 in FIG. 8 is not meant to imply physical or architectural limitations to the manner in which an illustrative embodiment may be implemented. Other components in addition to or in place of the ones illustrated may be used. Some components may be optional. Also, the blocks are presented to illustrate some functional components. One or more of these blocks may be combined, divided, or combined and divided into different blocks when implemented in an illustrative embodiment.

Figure 9:
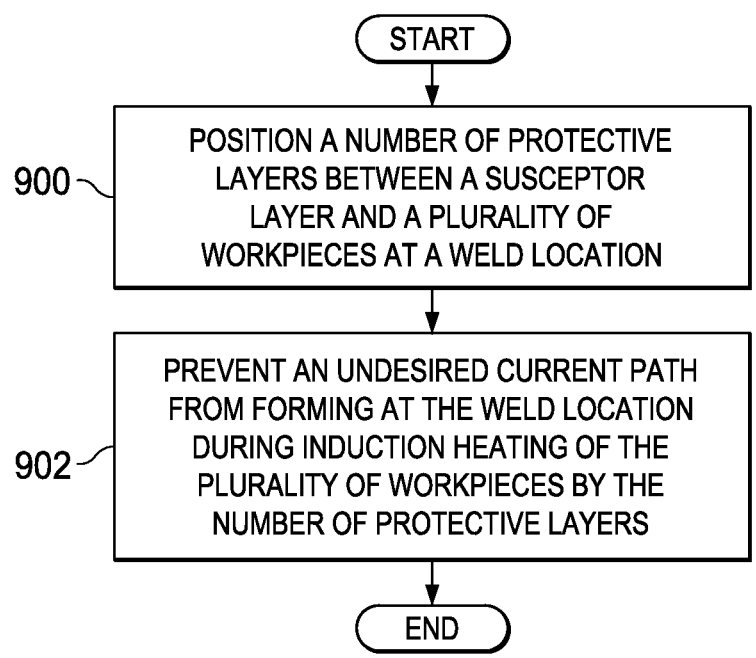
FIG. 9 is an illustration of a process for performing induction welding in the form of a flowchart in accordance with an illustrative embodiment.

With reference now to FIG. 9, an illustration of a process for performing induction welding is depicted in the form of a flowchart in accordance with an illustrative embodiment. The process described in FIG. 9 may be implemented using weld stack-up 818 described in FIG. 8.

The process may begin by positioning a number of protective layers between a susceptor layer and at least one of a plurality of workpieces at a weld location (operation 900). Thereafter, an undesired current path may be prevented, by the number of protective layers, from forming at the weld location during induction heating of the plurality of workpieces (operation 902), with the process terminating thereafter.

In one illustrative example, operation 900 may include positioning a first protective layer between a susceptor layer and a first workpiece at a weld location and positioning a second protective layer between the susceptor layer and a second workpiece at the weld location. Operation 902 may include preventing an undesired current path from forming at the weld location during induction heating of the first workpiece and the second workpiece by at least one of the first protective layer and the second protective layer.

Figure 10:
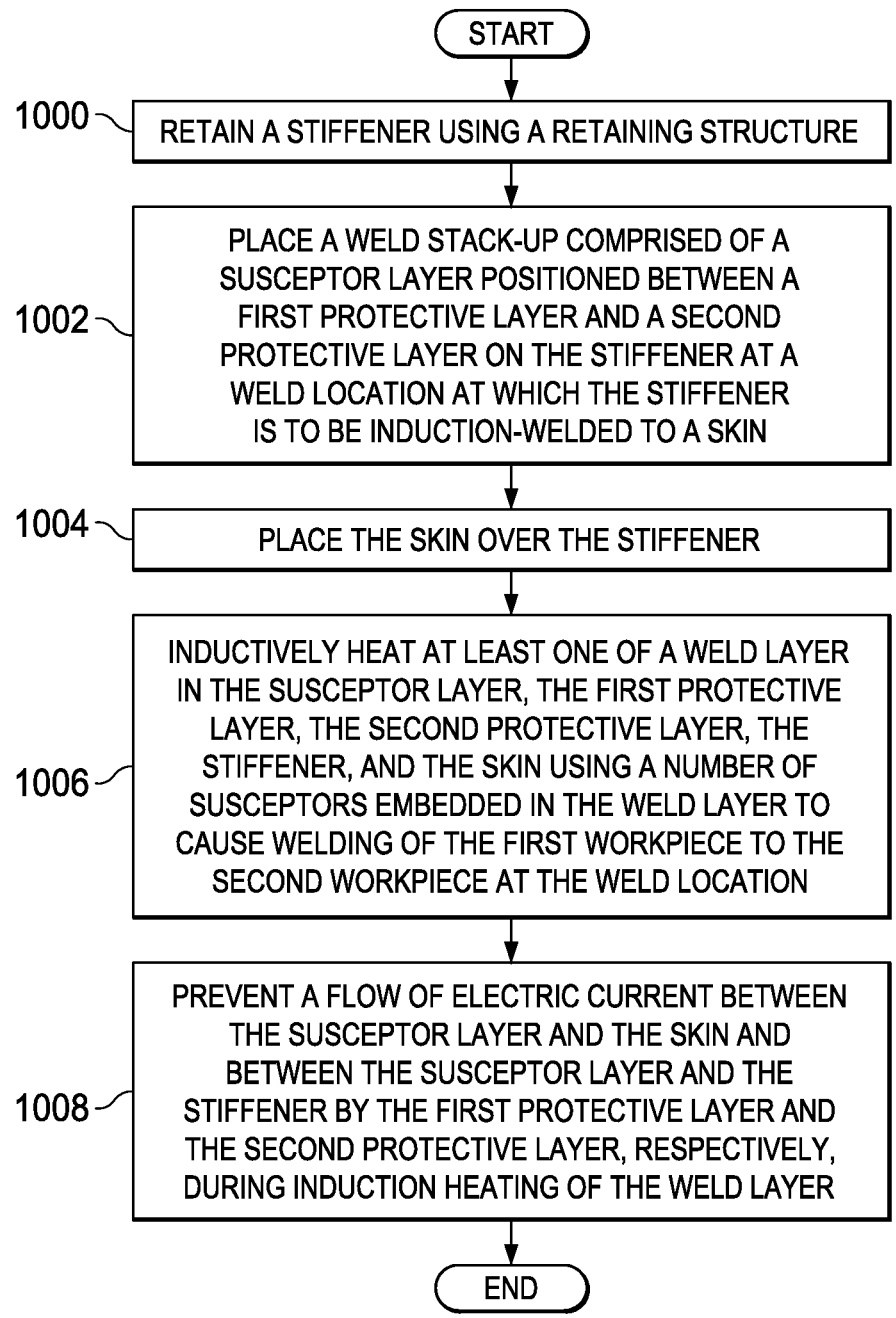
FIG. 10 is an illustration of a process for performing induction welding of a skin to a stiffener in the form of a flowchart in accordance with an illustrative embodiment.

With reference now to FIG. 10, an illustration of a process for performing induction welding of a skin to a stiffener is depicted in the form of a flowchart in accordance with an illustrative embodiment. The process illustrated in FIG. 10 may be implemented using induction welding system 802 in FIG. 8.

The process may begin by retaining a stiffener using a retaining structure (operation 1000). A weld stack-up comprised of a susceptor layer positioned between a first protective layer and a second protective layer may be placed on the stiffener at a weld location at which the stiffener is to be induction-welded to a skin (operation 1002).

Next, the skin is placed over the stiffener (operation 1004). An induction heating system is used to inductively heat at least one of a weld layer in the susceptor layer, the first protective layer, the second protective layer, the stiffener, and the skin using a number of susceptors embedded in the weld layer to cause welding of the first workpiece to the second workpiece at the weld location (operation 1006).

A flow of electric current between the susceptor layer and the skin and between the susceptor layer and the stiffener may be prevented by the first protective layer and the second protective layer, respectively, during induction heating of the weld layer (operation 1008), with the process terminating thereafter. In this manner, undesired effects may be prevented.

Figure 11:
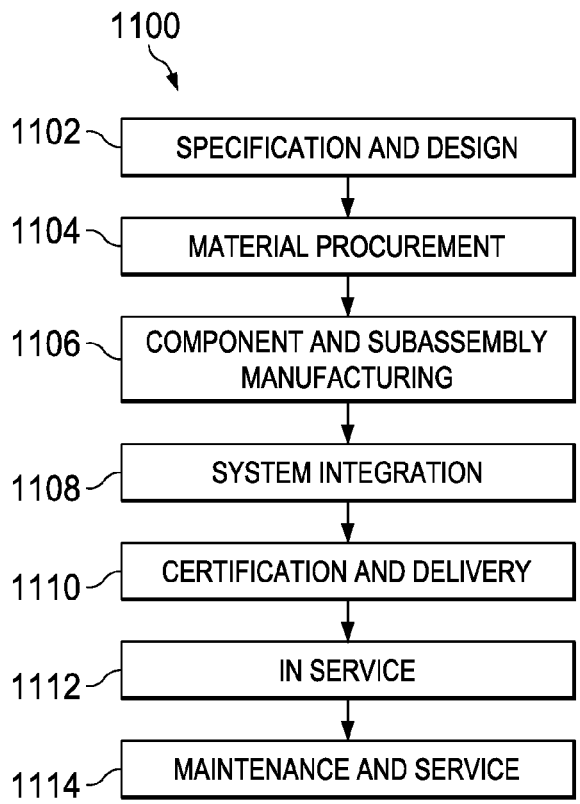
FIG. 11 is an illustration of an aircraft manufacturing and service method in the form of a flowchart in accordance with an illustrative embodiment.
Figure 12:
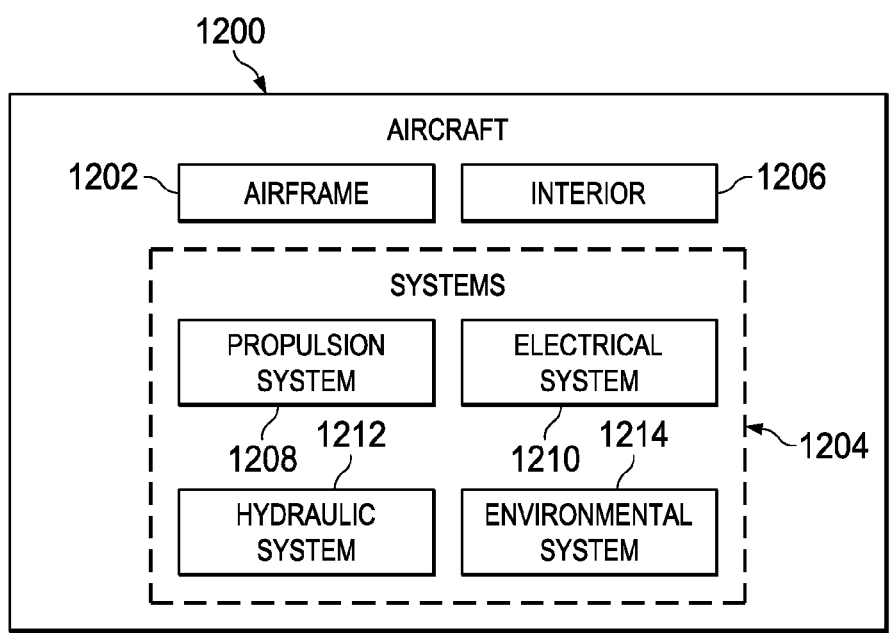
FIG. 12 is an illustration of an aircraft in the form of a block diagram in accordance with an illustrative embodiment.

Illustrative embodiments of the disclosure may be described in the context of aircraft manufacturing and service method 1100 as shown in FIG. 11 and aircraft 1200 as shown in FIG. 12. Turning first to FIG. 11, an illustration of an aircraft manufacturing and service method is depicted in the form of a flowchart in accordance with an illustrative embodiment. During pre-production, aircraft manufacturing and service method 1100 may include specification and design 1102 of aircraft 1200 in FIG. 12 and material procurement 1104.

During production, component and subassembly manufacturing 1106 and system integration 1108 of aircraft 1200 in FIG. 12 takes place. Thereafter, aircraft 1200 in FIG. 12 may go through certification and delivery 1110 in order to be placed in service 1112. While in service 1112 by a customer, aircraft 1200 in FIG. 12 is scheduled for routine maintenance and service 1114, which may include modification, reconfiguration, refurbishment, and other maintenance or service.

Each of the processes of aircraft manufacturing and service method 1100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 12, an illustration of an aircraft is depicted in the form of a block diagram in which an illustrative embodiment may be implemented. In this example, aircraft 1200 is produced by aircraft manufacturing and service method 1100 in FIG. 11 and may include airframe 1202 with plurality of systems 1204 and interior 1206. Examples of systems 1204 include one or more of propulsion system 1208, electrical system 1210, hydraulic system 1212, and environmental system 1214. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1100 in FIG. 11. In particular, weld stack-ups, implemented in a manner similar to weld stack-up 818 from FIG. 8, may be used during any one of the stages of aircraft manufacturing and service method 1100. For example, without limitation, weld stack-up 818 from FIG. 8 may be used during a welding operation performed during at least one of component and subassembly manufacturing 1106, system integration 1108, routine maintenance and service 1114, or some other stage of aircraft manufacturing and service method 1100.

In one illustrative example, components or subassemblies produced in component and subassembly manufacturing 1106 in FIG. 11 may be fabricated or manufactured in a manner similar to components or subassemblies produced while aircraft 1200 is in service 1112 in FIG. 11. As yet another example, one or more apparatus embodiments, method embodiments, or a combination thereof may be utilized during production stages, such as component and subassembly manufacturing 1106 and system integration 1108 in FIG. 11. One or more apparatus embodiments, method embodiments, or a combination thereof may be utilized while aircraft 1200 is in service 1112 and/or during maintenance and service 1114 in FIG. 11. The use of a number of the different illustrative embodiments may substantially expedite the assembly of and/or reduce the cost of aircraft 1200.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus that comprises:
   a retaining structure configured to retain a first workpiece and a second workpiece configured to be induction-welded to the first workpiece at a weld location;
   a susceptor layer comprised of a number of susceptors;
   a number of protective layers positioned between the susceptor layer and at least one of the first workpiece and the second workpiece at the weld location, the number of protective layers configured to be welded together and to prevent, during induction heating of the weld location, a flow of an electric current from at least one of:
      a susceptor in the number of susceptors into the first workpiece;
      the first workpiece to the second workpiece; and
      the second workpiece to the first workpiece, at the weld location.

2. The apparatus of claim 1, wherein the susceptor layer further comprises:
   a weld layer configured to be welded to the number of protective layers, wherein the number of susceptors is a number of susceptor wires embedded in the weld layer.

3. The apparatus of claim 2, wherein the weld layer is comprised of a thermoplastic material.

4. The apparatus of claim 2, wherein the number of susceptor wires is a number of smart susceptor wires.

5. The apparatus of claim 1, wherein the number of protective layers comprises: a material configured to prevent the flow of the electric current, a first protective layer positioned between the susceptor layer and the first workpiece at the weld location, and a second protective layer positioned between the susceptor layer and the second workpiece at the weld location.

6. The apparatus of claim 5, wherein the first protective layer and the second protective layer are comprised of a number of materials configured to prevent the electric current from flowing between the susceptor layer and the first workpiece and between the susceptor layer and the second workpiece.

7. The apparatus of claim 5, wherein the first workpiece is a skin and the second workpiece is a stiffener.

8. The apparatus of claim 5, wherein the first workpiece is comprised of a first thermoplastic material and the second workpiece is comprised of a second thermoplastic material.

9. The apparatus of claim 8, wherein the first thermoplastic material is a same material as the second thermoplastic material.

10. The apparatus of claim 5, wherein the first protective layer and the second protective layer are comprised of a thermoplastic material selected from one of: a fiberglass material or a resin material.

11. The apparatus of claim 1, wherein the susceptor layer and the number of protective layers form a weld stack-up for use in welding a first workpiece to a second workpiece at the weld location.

12. The apparatus of claim 11, wherein the weld stack-up is configured for use within an induction welding system.

13. The apparatus of claim 1, further comprising:
   an induction heating system; and
   a number of weld stack-ups, each weld stack-up in the number of weld stack-ups configured to be positioned at a corresponding weld location in the number of weld locations to prevent an undesired current path, outside a susceptor layer in the each weld stack-up respectively, between one surface of the each weld stack-up and an opposite surface in the each weld stack-up during induction heating of the each weld stack-up.

14. The apparatus of claim 13, further comprising: a weld stack-up in the number of weld stack-ups positioned at a weld location in the number of weld locations that comprises:
   a first protective layer positioned between the susceptor layer and the first workpiece at the weld location; and
   a second protective layer positioned between the susceptor layer and the second workpiece at the weld location, such that each protective layer comprises a material configured to prevent the flow of the electric current.

15. An apparatus configured to weld a first workpiece to a second workpiece, such that the apparatus comprises:
   a retaining structure configured to retain a first workpiece and a second workpiece configured to be induction-welded to the first workpiece at a weld location;
   a susceptor layer that comprises an electrically conductive material;
   a number of protective layers configured to sandwich the susceptor layer at the weld location, such that the number of protective layers comprises a material configured to inductive weld to objects and prevent a flow of an electric current, responsive to a current applied to the susceptor layer, from the first workpiece adjacent to a protective layer on one side of the susceptor layer, to the second workpiece adjacent to a protective layer on an opposite side of the susceptor layer.

16. The apparatus of claim 15, further comprising:
   a first protective layer positioned between the susceptor layer and a first workpiece in a plurality of workpieces at the weld location, wherein the first workpiece comprises a first thermoplastic material that comprises a first characteristic that prevents the flow of the electric current; and
   a second protective layer positioned between the susceptor layer and a second workpiece in the plurality of workpieces at the weld location, wherein the second workpiece is comprised of a second thermoplastic material that comprises a second characteristic that prevents the flow of the electric current.

17. The apparatus of claim 16, further comprising a susceptor level comprising a number of susceptors embedded within and configured to inductively heat at least one of: a weld layer in the susceptor layer, the first protective layer, the second protective layer, the first workpiece, and the second workpiece.

18. The apparatus of claim 17, further comprising the number of susceptors configured to energize via a radio frequency electric current that generates an electromagnetic field of electromagnetic energy absorbed by the number of susceptors.

19. The apparatus of claim 18, further comprising the number of susceptors configured to, responsive to an absorption of the electromagnetic energy, dissipate heat into at least one of: the weld layer in the susceptor layer, the first protective layer, the second protective layer, the first workpiece, and the second workpiece.

20. An apparatus configured for induction welding, such that the apparatus comprises;
   a retaining structure configured to retain a first workpiece and a second workpiece configured to be induction-welded to the first workpiece at a weld location; and
   a number of protective layers configured to sandwich a susceptor layer in a weld stack at the weld location, such that the number of protective layers comprises a material configured to be welded together and at least one of: interrupt, and prevent, a flow of electric current, responsive to current applied to the susceptor layer, between at least one of:
a surface, away from the susceptor layer, of a protective layer on one side of the susceptor layer, and a surface, away from the susceptor layer, of a protective layer on an opposite side of the susceptor layer; and
a susceptor in the susceptor layer and at least one of:
  the surface, away from the susceptor layer, of the protective layer on the one side of the susceptor layer; and
  the surface, away from the susceptor layer, of the protective layer on the opposite side of the susceptor layer, such that the susceptor layer comprises a number of susceptors configured to be energized and produce heat to a designated Curie temperature.

\* \* \* \* \*